(12) United States Patent
Grant

(10) Patent No.: US 12,165,543 B2
(45) Date of Patent: Dec. 10, 2024

(54) CAR TOP HAT DEVICE

(71) Applicant: Serena Grant, Slidell, LA (US)

(72) Inventor: Serena Grant, Slidell, LA (US)

( * ) Notice: Subject to any disclaimer, the term of this patent is extended or adjusted under 35 U.S.C. 154(b) by 37 days.

(21) Appl. No.: 18/100,697

(22) Filed: Jan. 24, 2023

(65) Prior Publication Data

US 2023/0162631 A1    May 25, 2023

(51) Int. Cl.
| | | |
|---|---|---|
| *G09F 21/04* | (2006.01) | |
| *B60Q 1/26* | (2006.01) | |
| *B60Q 1/50* | (2006.01) | |
| *B60R 11/02* | (2006.01) | |
| *B60R 13/00* | (2006.01) | |
| *G09F 13/02* | (2006.01) | |
| *G09F 19/00* | (2006.01) | |
| *G09F 27/00* | (2006.01) | |
| *B60R 11/00* | (2006.01) | |

(52) U.S. Cl.
CPC ......... *G09F 21/041* (2020.05); *B60Q 1/2615* (2013.01); *B60Q 1/544* (2022.05); *B60Q 1/549* (2022.05); *B60R 11/0217* (2013.01); *B60R 13/00* (2013.01); *G09F 13/02* (2013.01); *G09F 19/00* (2013.01); *G09F 27/00* (2013.01); *B60R 2011/004* (2013.01); *B60R 2011/0057* (2013.01)

(58) Field of Classification Search
CPC ........ G09F 21/041; G09F 13/02; G09F 19/00; G09F 27/00; B60Q 1/2615; B60Q 1/544; B60Q 1/549; B60Q 1/2611; B60R 11/0217; B60R 13/00; B60R 2011/004; B60R 2011/0057; B60R 11/00
See application file for complete search history.

(56) References Cited

U.S. PATENT DOCUMENTS

| | | | | |
|---|---|---|---|---|
| D368,463 | S * | 4/1996 | Kazenelson | D12/190 |
| 5,549,939 | A * | 8/1996 | Ray | G09F 21/04 |
| | | | | 428/31 |
| 5,939,155 | A * | 8/1999 | Voznick | B60R 13/005 |
| | | | | 428/31 |
| D571,709 | S * | 6/2008 | Parsons | D12/401 |
| D705,716 | S * | 5/2014 | Newman | D12/400 |
| D864,085 | S * | 10/2019 | Wohlwender | D12/401 |
| 2017/0253193 | A1* | 9/2017 | Murphy | G09F 21/04 |

FOREIGN PATENT DOCUMENTS

DE    202013007750 U1 *  11/2013  ............ B60R 9/04

* cited by examiner

*Primary Examiner* — Cassandra Davis
(74) *Attorney, Agent, or Firm* — Norton IP Law Firm LLC; Taylor M. Norton

(57) ABSTRACT

A removable hat device for a motor vehicle roof is disclosed, having a base housing, a tubular guide, a hat cover body, a hat base, a central cylindrical support column, and an elongated bolt. The base housing includes plurality of rubber coated magnetic feet adapted to removably magnetically adhere to the roof of the motor vehicle. The base housing further includes an upstanding cylindrical sleeve. The tubular guide is fixed to the base housing. The hat cover body is attached to the base housing via a circular ring shaped platform having a plurality of spokes extruding from the central cylindrical support column. The central cylindrical support column is telescopically received in the upstanding hollow cylindrical sleeve of the base housing. The elongated bolt removably extends through the tubular guide, the hat cover body, the upstanding cylindrical sleeve, and locks at the central cylindrical support column.

16 Claims, 6 Drawing Sheets

CAR TOP HAT DEVICE

BACKGROUND OF THE INVENTION

Field of the Invention

The present invention generally relates to car mounted decorative devices and, more particularly, relates to car roof mounted devices.

Description of the Related Art

Decoration components such as wreaths, light emitting diodes (LEDs), and vinyl wrapping films are often a common way to embellish or decorate a person's vehicle. Presently, in festivals, decorations are often hung on the vehicle doors or mounted within the opening of the vehicle's windows, for increasing festival atmosphere. For example, during Christmas season, or in the Spring time, Christmas decorations or seasonally festive decorative wreaths are hung on the hood of a car. Oftentimes, a decorative bow is placed on a roof of a car when the car is given to a person as a gift, such as when celebrating a graduation event. However, there are limited options and conventional decorations are typically flimsy, difficult to fix to the car, and do not last due to the elements of weather, thereby requiring a person to purchase additional decorations down the road. Moreover, most of the available vehicle decorations have a static ornamental design and, oftentimes, a user gets bored with seeing the same ornamental design on the vehicle for too long of a time or when the season changes.

A need therefore exists for a decorative car top component capable of universal application. Accordingly, there is a need for decorative car top components that may be easily positioned and/or repositioned at the option and intention of the user without complex assembly and setup.

For a number of years, the taxi industry has been exploiting the additional revenue available through display of advertising material on the external surfaces of taxis, and upon devices attached to the external panels of taxis designed to increase the surface area or visibility of such advertising.

Various type of devices is known in the art that can be mounted to the top of the vehicle. Magnetic top mounted decorations are commonly used devices mounted on top of the vehicle for the purpose of identification and classification of vehicles. Further, the magnetic top caps are used for marking vehicles with messages like "customer waiting", "wash", "hire", "occupied", "rent", "Buy", etc.

In addition, the phenomenon of tailgate partying has become entrenched in American culture. Such pregame festivities usually occur in the parking lot of stadiums and arenas, before and occasionally after games and concerts. Tailgate culture has even spread to events such as weddings and other non-sports related gatherings. The phenomenon of tailgating has become so mainstream in American culture that manufacturers have responded to the tailgating phenomenon with a variety of innovative "tailgating gear" products, ranging from vehicle mounted grills and coolers to games and furnishings.

Participants in the tailgating community crave high visibility in order to be easily located within a mass of parked vehicles. Currently, whimsical decorations are used for visibility and sheer entertainment value, often demonstrating support for the tailgaters' favorite sports team. Yet there are many issues with such conventional decorations. In particular, oftentimes the whimsical decorations are cardboard cutouts or other paraphernalia that are difficult to haul or carry, can easily be broken, or simply is not large enough to attract attention to the tailgating area.

Further, there is always a risk of blowing away of decorative items in moderate to extreme weather conditions. Furthermore, the decorative items can often be easily stolen. A need therefore exists for a removable hat device removably mounted on roof of the vehicle and can be readily removed with ease by the owner. Accordingly, the removable hat device should be robust, and easily transportable and replaceable.

Moreover, with a highly saturated television market, it is found to be increasingly difficult for advertisers or businesses to reach their audiences in a cost-effective manner through conventional advertising. Further, the advent of social media has induced consumers to shop online rather than pay attention to commercials. Newspapers are in decline as well, as their advertising base dissipates with the digital age. Accordingly, there is a need for a cost-effective advertising solution, for a large, existing audience.

Accordingly, one principle object of the present invention is to provide a robust, decorative system that can be used at remote locations. Another object of the present invention is to provide a decorative system that is easy to transport and operate. Yet another object of the present invention is to provide a decorative system that can be easily located while driving the streets or while parked within a mass of parked vehicles.

It is one prospect of the present invention to provide a removable decoration device of simple but effective construction which can be applied to nearly any vehicle to securely and efficiently retain hats of different sizes and shapes.

Another object of the present invention is to provide a decorative system that is low cost, and yet is easily and securely attached to the roof of the vehicle, in a safe and convenient manner. Yet another object of the present invention is to provide a decorative system that is light and small. Another object of the present invention is to provide for decorative car top components that provide for improved mobility, setup, and retention characteristics in order to efficiently interchange the decorative aspects in a multitude of environments.

A further object of the disclosed invention is to provide for a cost-effective advertising solution.

As disclosed in this application, the inventors have discovered novel and unique devices and methods for detachably attaching a hat device to a vehicle's roof, which exhibit superlative properties without being dependent on heavy, immobile, components.

The devices disclosed herein avoid many of the drawbacks of existing devices which rely on expensive complexities or complex tools for application of the devices to the car.

Embodiments of the present invention provide for removable hat device as described and defined in the description below and in the annexed claims which provide for improved mobility, setup, and retention characteristics in order to efficiently interchange decorative ornaments of various sizes of interest in a multitude of environments.

SUMMARY OF THE INVENTION

Disclosed herein is an improved decoration in the form of a removable hat device for a vehicle. The removable hat device comprises a base housing, a tubular guide, a hat cover body, a hat base, a central cylindrical support column, and an elongated bolt.

In one embodiment, the base housing includes a planar body having a top surface opposite to a bottom surface. Preferably, the base housing includes a skirt wall extending transversely from the bottom surface and defining an inner housing cavity. In a preferred embodiment, the base housing includes plurality of rubber coated magnetic feet fixed to the bottom surface of the planar base body within the inner housing cavity. The plurality of rubber coated magnetic feet are adapted to removably magnetically adhere to the roof of the motor vehicle. In one embodiment, each rubber coated magnetic foot of the plurality of rubber coated magnetic feet comprises a shape of a round disk.

In one embodiment, the base housing further includes an upstanding cylindrical sleeve extending upwardly from the top surface of the planar base body. The upstanding cylindrical sleeve preferably defines at least a first sleeve aperture in coaxial alignment with at least a second sleeve aperture. The at least second sleeve aperture preferably includes internal threads. The elongated bolt is removably connected to the upstanding cylindrical sleeve, where the elongated bolt extends through the at least first sleeve aperture and is threaded into the at least second sleeve aperture.

The tubular guide is fixed to the top surface of the planar base body. The tubular guide defines a passageway in coaxial alignment with the at least first sleeve aperture and the at least second sleeve aperture. In such embodiment, the elongated bolt removably extends through the tubular guide, through the at least first sleeve aperture and into the at least second sleeve aperture of the upstanding cylindrical sleeve, where the elongated bolt extends through the at least first sleeve aperture and is threaded into the at least second sleeve aperture.

In a preferred embodiment, the hat cover body includes a top planar member, an annular wall extending downwardly from the top planar member, where the annular wall defines a hat cover body inner cavity. In such embodiment, the hat cover body presents the appearance of a graduation hat.

A corrugated wall preferably extends downwardly from the top planar member of the hat cover body, where the corrugated wall is disposed inside the hat cover body inner cavity. In a preferred embodiment, the corrugated wall is concentrically disposed within the inner cavity of the cover body. The corrugated wall includes a plurality of outer portions fixed to respective portion of an inner surface of the annular wall.

At least a portion of the annular wall defines at least one annular wall aperture. Further, the corrugated wall defines at least one corrugated wall aperture, and the at least one corrugated wall aperture is positioned in coaxial alignment with the at least one annular wall aperture, the at least first sleeve aperture, and the at least second sleeve aperture.

The hat base having a circular ring shaped platform disposed within the hat cover body. The circular ring shaped platform is connected to a plurality of inner portions of the corrugated wall of the hat cover body. The central cylindrical support column is attached to the circular ring shaped platform via a plurality of spokes extruding from the central cylindrical support column. The central cylindrical support column is telescopically received in the upstanding hollow cylindrical sleeve. The central cylindrical support column defining at least a first locking aperture in coaxial alignment with at least a second locking aperture.

The elongated bolt is removably extended through the tubular guide, through the at least one annular wall aperture, through the at least one corrugated wall aperture, through the at least first sleeve aperture, through the at least first locking aperture, and through the at least second locking aperture.

The elongated bolt is removably threaded into the internal threads of the at least second sleeve aperture of the upstanding cylindrical sleeve in a locked position.

In one embodiment, the removable hat device includes a rope tassel having a fixed end opposite a free end, the fixed end connected to a top surface of the top planar member of the hat cover body.

In one embodiment, the removable hat device includes a plug removably inserted into the at least one annular wall aperture, said plug adapted enclose the annular wall when said elongated threaded bolt is in the locked position.

In another embodiment, the circular ring shaped platform comprises a plurality of connection tabs disposed along an outer periphery of the circular ring shaped platform, wherein said plurality of connection tabs are removably connected to, respectively, a plurality of portions of said corrugated wall of the hat cover body.

In another embodiment, the removable hat device for a motor vehicle roof further comprises a plurality of light emitting diodes disposed along an outer surface of the annular wall of said hat cover body.

In another embodiment, the removable hat device for a motor vehicle roof further comprises a battery electrically connected to said light emitting diodes.

In yet another embodiment, the removable hat device includes a Bluetooth® (short-range wireless) speaker preferably disposed along the outer surface of the annular wall of the hat cover body. In one such embodiment, the Bluetooth speaker includes an internal battery adapted to be recharged by a user. In another embodiment, the removable hat device includes a Bluetooth speaker disposed within the top planar member of the hat cover body, preferably oriented downwardly toward the ground. In one such embodiment, the Bluetooth speaker includes an internal battery adapted to be recharged by a user. In one embodiment, the removable hat device includes a battery electrically connected to the Bluetooth speaker. In yet another embodiment, the removable hat device includes a power cord connected to the Bluetooth Speaker, and that power cord is adapted to removably connect to a 12-volt outlet of the motor vehicle.

Additional objects, advantages and novel features of this invention shall be set forth in the description that follows, and in part will become apparent to those skilled in the art upon examination of the following specification and claims of my invention. The objects and advantages of the invention may be realized and attained by means of the instrumentalities, combinations, and devices particularly pointed out in the appended claims.

The following presents a simplified summary of the present disclosure in a simplified form as a prelude to the more detailed description that is presented herein.

Therefore, to achieve the foregoing and other objects and in accordance with the purposes and embodiments of the present invention, as embodied and described herein, there is provided a removable hat device.

These and other features, aspects, and advantages of the present invention will become better understood with reference to the following description and appended claims.

DETAILED DESCRIPTION

Figure 1:
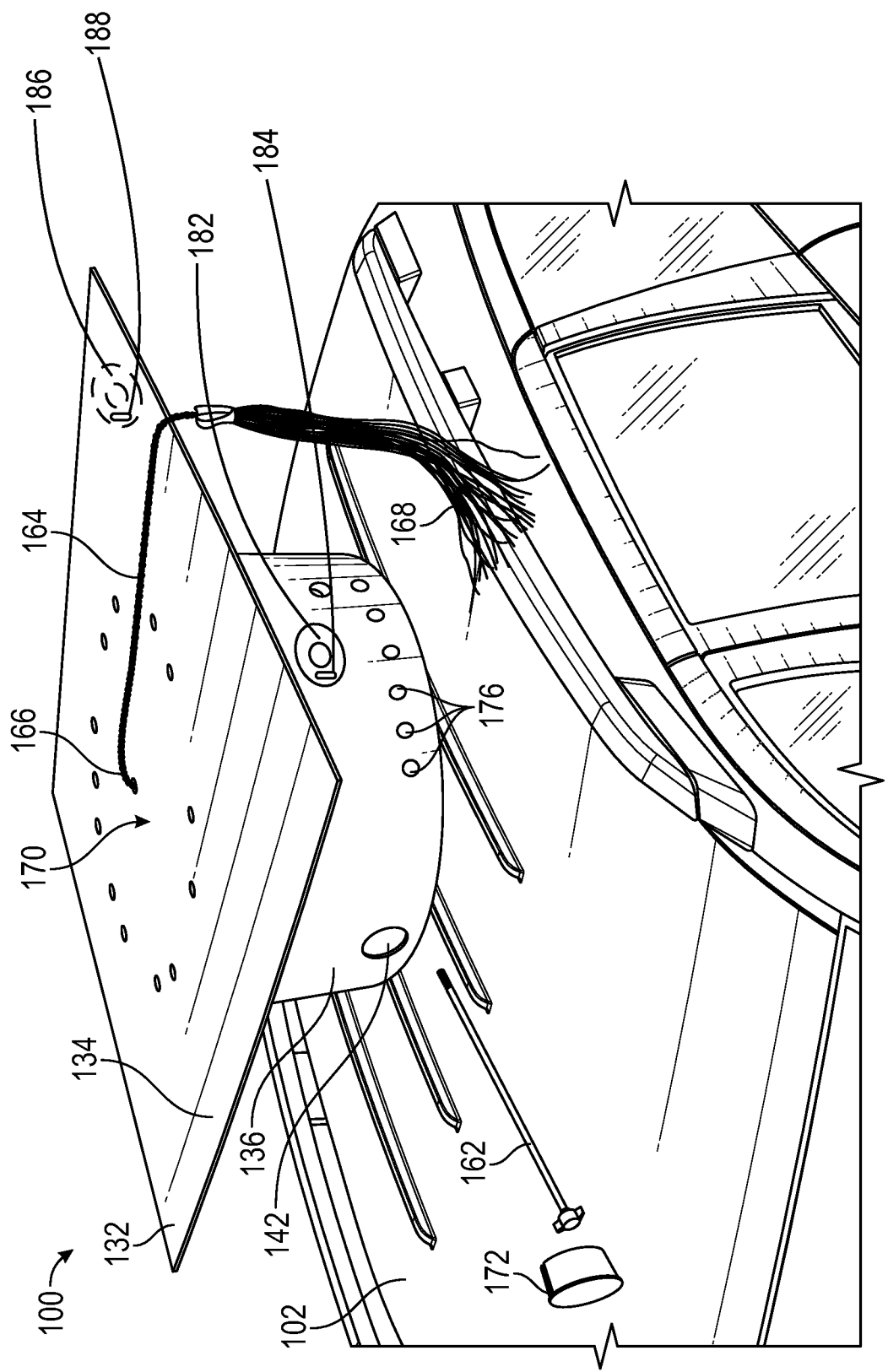
FIG. 1 is a side perspective view of a removable hat device, in accordance with embodiments of the invention.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

For purposes of clarity and orientation with respect to a person, referred to herein as a user, it is noted that a transverse (also known as axial or horizontal) plane is an X-Z plane, parallel to the ground. A frontal (also known as coronal) plane is a Y-X plane, perpendicular to the ground, which separates the anterior from the posterior, the front from the back. A sagittal (also known as lateral) plane is an Y-Z plane, perpendicular to the ground, which separates left from right. Objects are coplanar if they all lie in the same plane. For example, one axis is coplanar with another axis when the two axes lie in the same plane.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, glass, metals, alloys, paper, board, resins, and coatings.

Reference will now be made in detail to the present preferred embodiments of the invention, examples of which are illustrated in the accompanying drawings. Wherever possible, the same reference numerals are used in the drawings and the description to refer to the same or like parts.

Referring initially to FIGS. 1-6, a removable hat device 100 is disclosed. The removable hat device 100 is mounted on a motor vehicle roof 102. The removable hat device includes a base housing 104, a tubular guide 128, a hat cover body 132, a hat base 148, a central cylindrical support column 154, and an elongated bolt 162.

Referring to FIG. 1, the removable hat device 100 is removably mounted on top of the motor vehicle roof 102. In a preferred embodiment, the hat cover body 132 includes a top planar member 134, an annular wall 136 extending from the top planar member 134 and defining a hat cover body inner cavity 138 (shown in FIG. 3). The annular wall 136 define at least one annular wall aperture 142.

In other embodiment, the hat cover body 132 includes a rope tassel 164 having a fixed end 166 opposite a free end 168. The fixed end 166 is connected to a top surface 170 of the top planar member 134 of the hat cover body 132. Further, the removable hat device 100 preferably includes a plug 172 removably inserted into the at least one annular wall aperture 142. The plug 172 is adapted to enclose the annular wall 136 when the elongated bolt 162 is in a locked position.

In one embodiment, the removable hat device 100 further includes plurality of light emitting diodes 176 disposed along an outer surface of the annular wall 136 of the hat cover body 132. Further in exemplary embodiment, the hat cover body 132 is molded in the shape of a graduation hat, as exemplified in FIG. 1.

However, it would be readily apparent to those skilled in the art that various shapes and sizes of the hat cover body 132 may be envisioned such as baseball cap, birthday hat, football helmet, etc. without deviating from the scope of the present invention.

Figure 2:
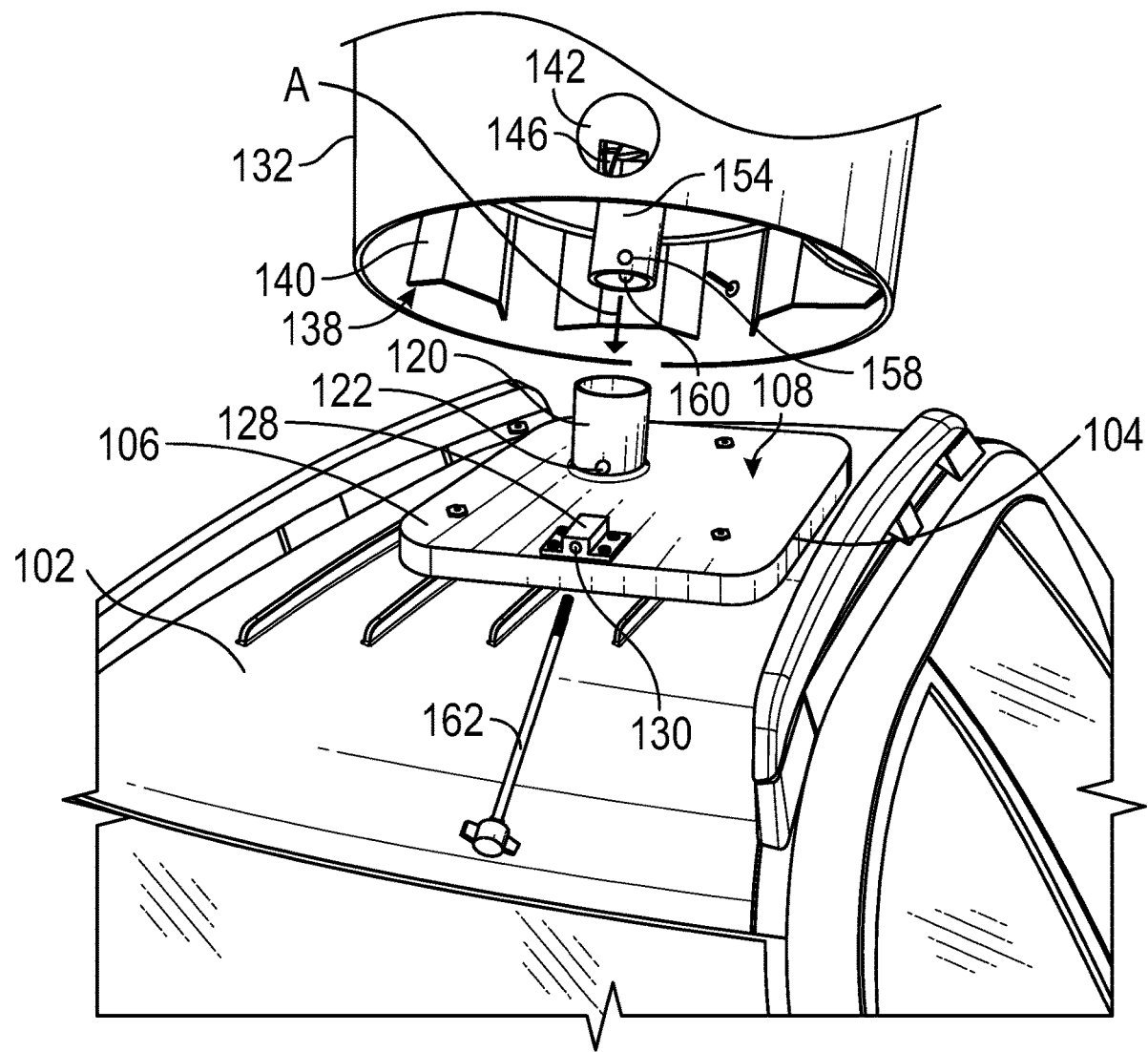
FIG. 2 is a side perspective view of a base housing receiving a hat cover body, in accordance with embodiments of the invention.
Figure 3:
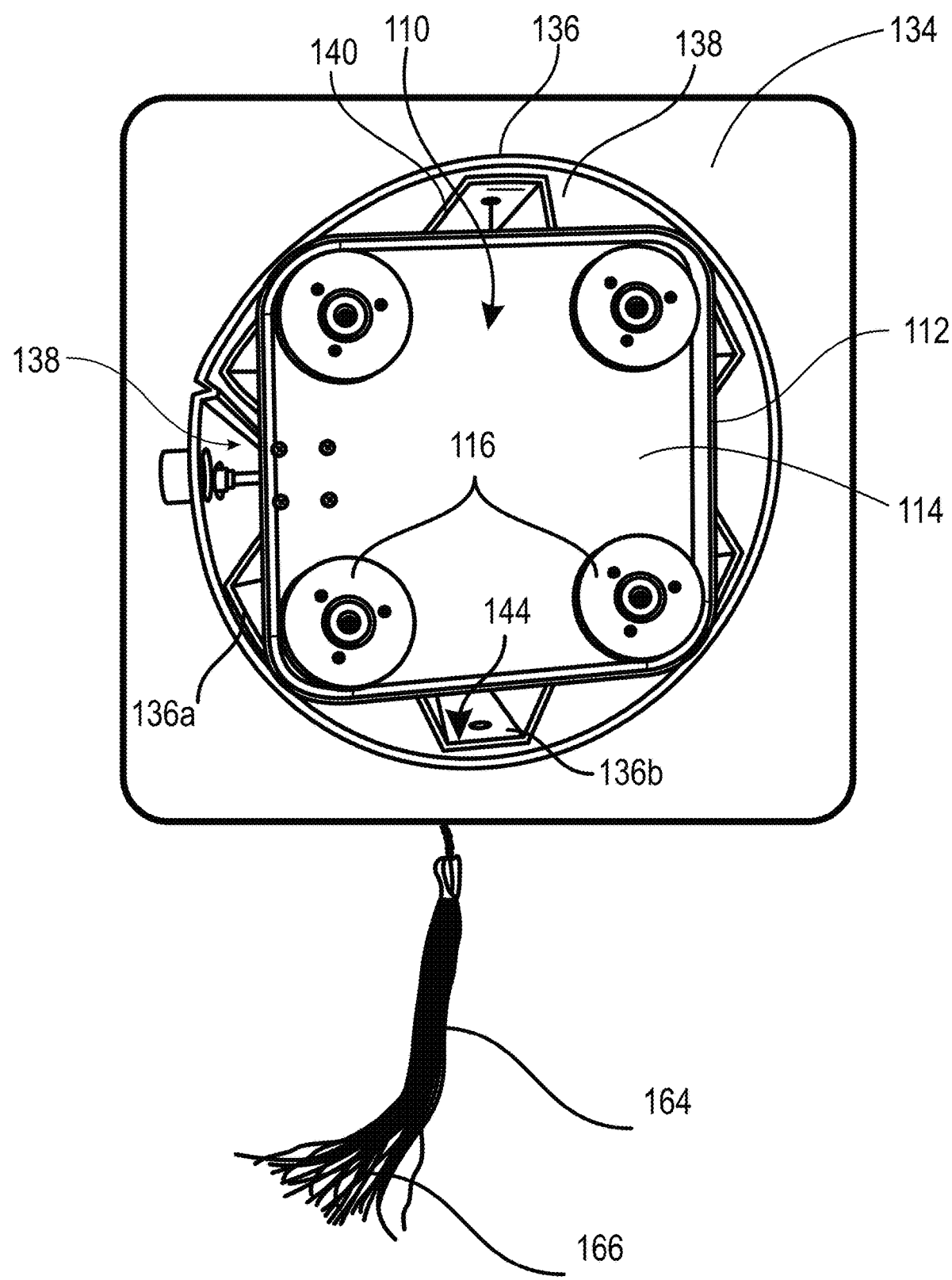
FIG. 3 is a rear view of the removable hat device, in accordance with other embodiments of the invention.

Referring to FIGS. 2-3, the base housing 104 includes a planar base body 106 having a top surface 108 opposite a bottom surface 110 (shown in FIG. 3). The base housing 104 includes an upstanding cylindrical sleeve 120 extending upwardly from the top surface 108 of the planar base body 106. The upstanding cylindrical sleeve 120 defines at least a first sleeve aperture 122 in coaxial alignment 123 with at least a second sleeve aperture 124 (shown in FIGS. 4-5). The second sleeve aperture 124 of the upstanding cylindrical sleeve 120 preferably includes internal threads.

The tubular guide 128 is fixed to the top surface of the planar base body 106. The tubular guide 128 defines a passageway 130 in coaxial alignment with the at least first sleeve aperture 122 and the at least second sleeve aperture (124, shown in FIG. 5). The cylindrical sleeve 120 is hollow. The central cylindrical support column 154 is telescopically received (shown by Arrow A) in the hollow upstanding cylindrical sleeve 120. The central cylindrical support column 154 defines at least a first locking aperture 158 in coaxial alignment with at least a second locking aperture 160, as illustrated in FIGS. 1, 2, 4, and 5.

Figure 5:
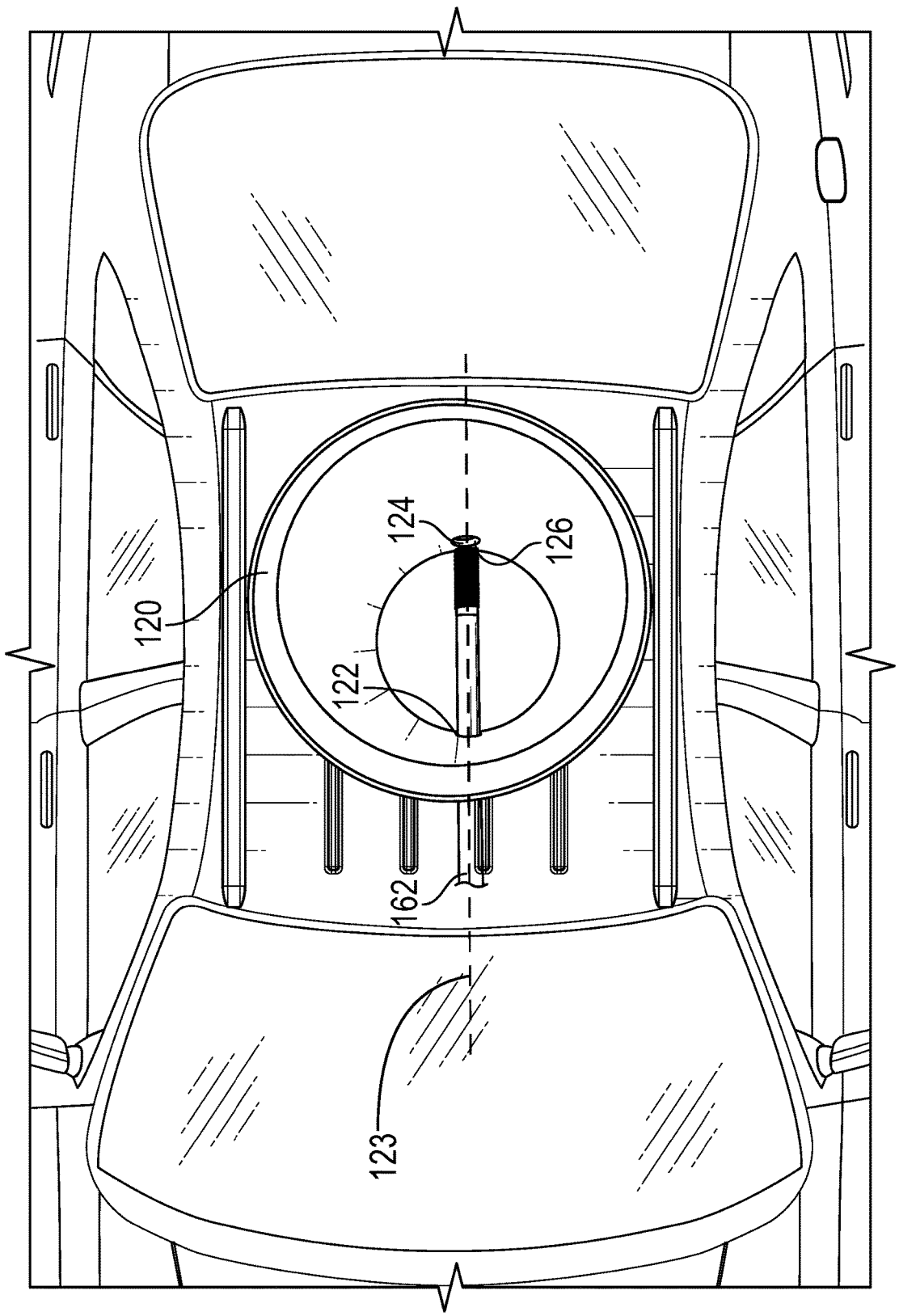
FIG. 5 is a top view of an upstanding cylindrical sleeve extending from the base housing, in accordance with embodiments of the invention.
Figure 6:
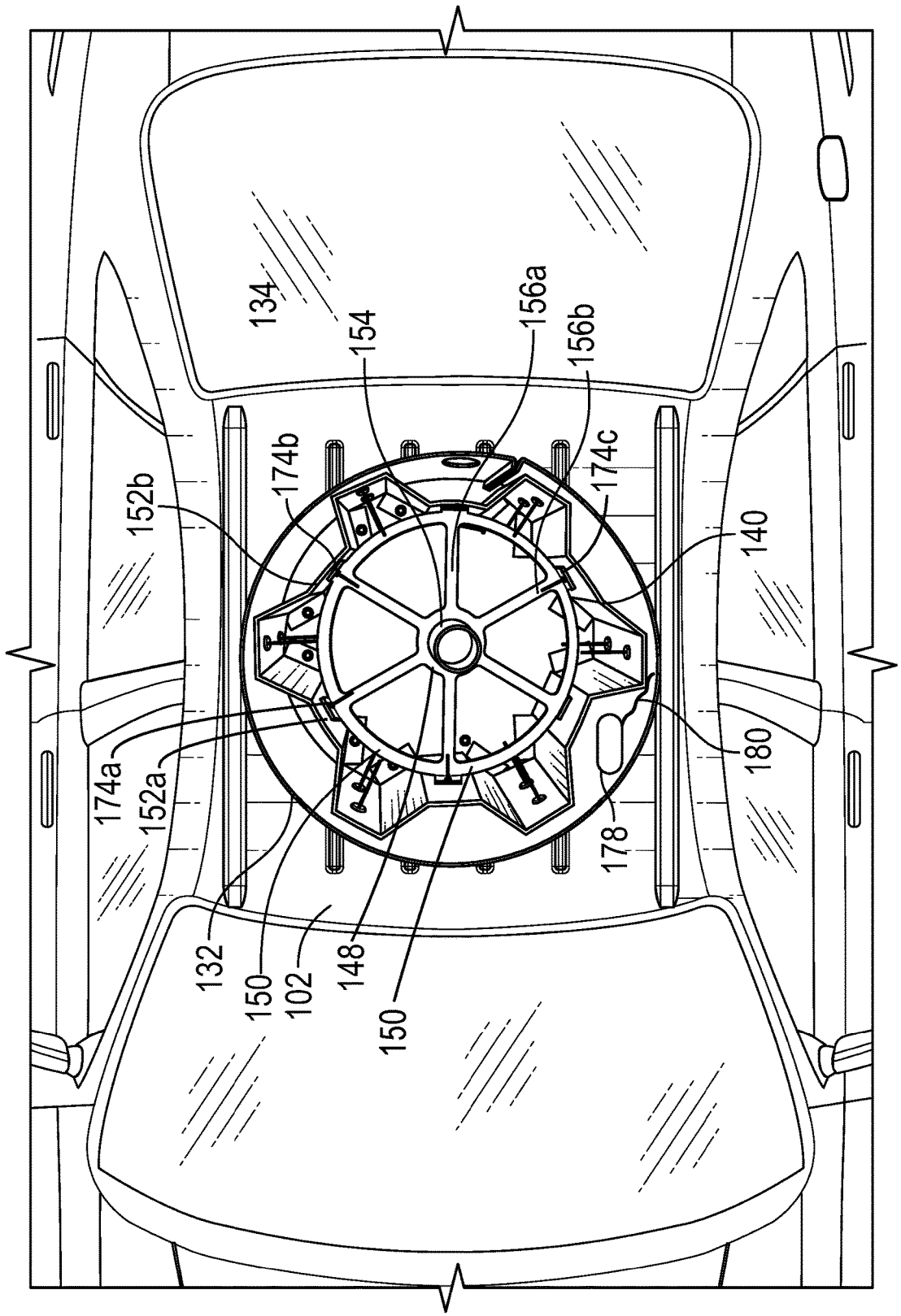
FIG. 6 is a rear perspective view of the central cylindrical support column attached to a hat cover body, in accordance with embodiments of the invention.

As shown in FIG. 6, the hat cover body 132 preferably includes a corrugated wall 140 extending from the top planar member 134 (shown in FIG. 1). The corrugated wall 140 is concentrically disposed within the hat cover body inner cavity 138. The corrugated wall 140 includes at least one corrugated wall aperture 146 in coaxial alignment with the at least one annual wall aperture 142, the at least first sleeve aperture 122, and the at least second sleeve aperture 124 (shown in FIG. 5).

Figure 4:
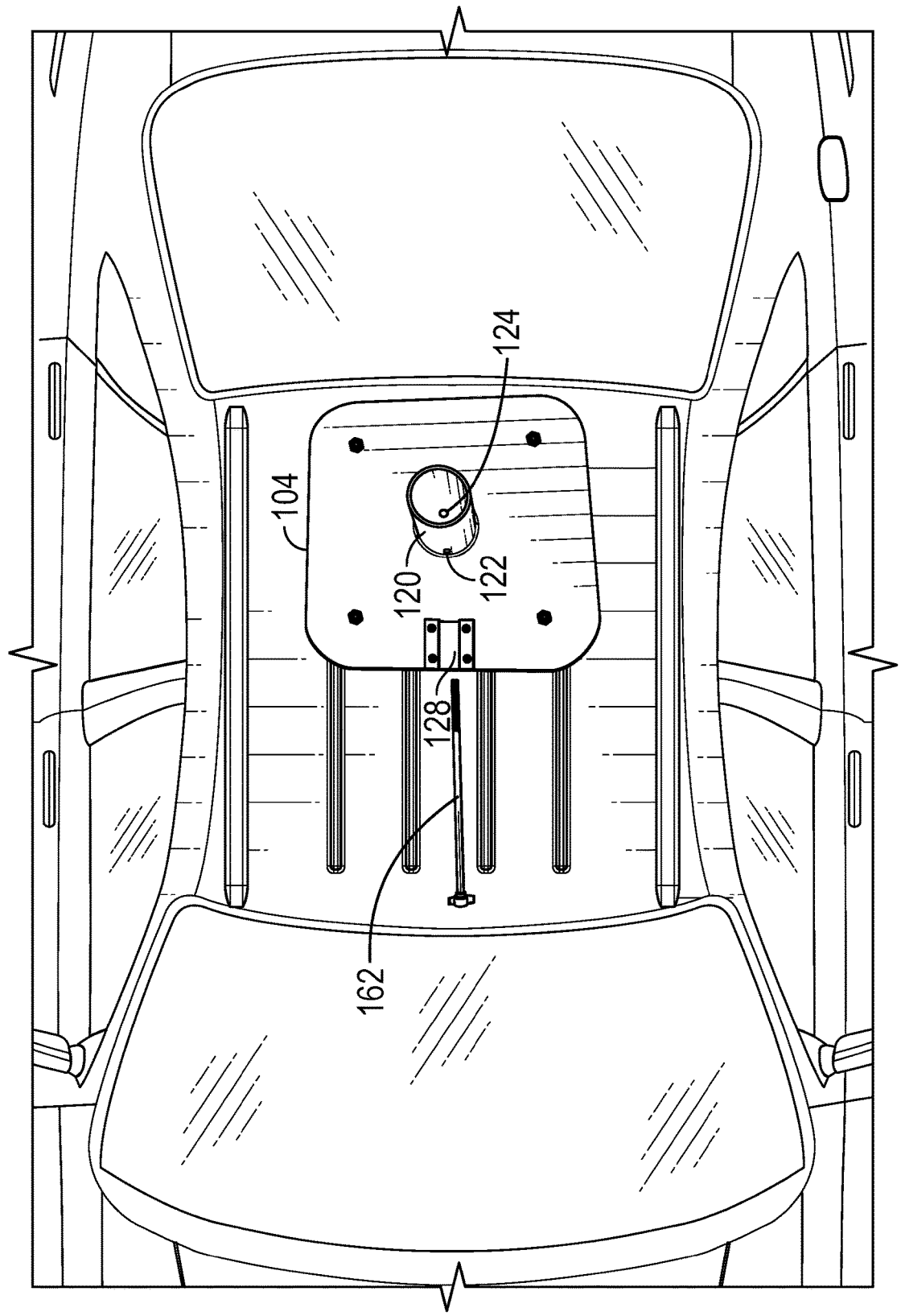
FIG. 4 is a top perspective view of the base housing, in accordance with other embodiments of the invention.

Referring to FIGS. 2, 4, and 5, the elongated bolt 162 is removably extended through the tubular guide 128, through the at least one annular wall aperture 142, through the at least one corrugated wall aperture 146, through the at least first sleeve aperture 122, through the at least first locking aperture 158, through the at least second locking aperture 160. The elongated bolt 162 is removably threaded into the internal threads of the at least second sleeve aperture 124 (shown in FIG. 5) in the locked position.

Referring to FIG. 3, the base housing 104 includes a skirt wall 112 extending transversely from the bottom surface 110 of the base housing 104, and the base housing 104 and skirt wall 112 define an inner housing cavity 114. As can be seen in FIG. 3, the inner housing cavity 114 of the base housing 104 is defined by the bottom surface 110 of the base housing 104 and the skirt wall 112 of the base housing 104.

As illustrated in FIG. 3, the corrugated wall 140 of the hat cover body 132 includes a plurality of outer portions 136a, 136b fixed to an inner surface 144 of the annular wall 136. The base housing 104 includes a plurality of rubber coated magnetic feet 116 fixed to the bottom surface 110 of the planar base body 106 (shown in FIG. 2) of the base housing 104 within the inner housing cavity 114.

In a preferred embodiment, the plurality of rubber coated magnetic feet 116 are adapted to removably magnetically adhere to the motor vehicle roof 102. In one embodiment, the shape of each rubber coated magnetic foot of the plurality of rubber coated magnetic feet 116 is round. In another embodiment, the shape of each rubber coated magnetic foot of the plurality of rubber coated magnetic feet 116 is square. However, it would be readily apparent to those skilled in the art that various shapes of the plurality of rubber coated magnetic feet 116 may be envisioned without deviating from the scope of the present invention.

Referring to FIG. 4, the tubular guide 128 provides the passageway 130 (shown in FIG. 2) in coaxial alignment with the at least first sleeve aperture 122 and the at least second leave aperture 124. The tubular guide 128 is securely attached to the base housing 104 using attachment units, such as screw fasteners. Example of the attachment unit includes but not limited to screw, nuts, bolts, glue, and welds.

Referring to FIGS. 2, 4, and 5, the upstanding cylindrical sleeve 120 extends upwardly from the top surface 108 of the base housing 104. The at least second sleeve aperture 124 includes internal threads 126. The elongated bolt 162 passes through the at least first sleeve aperture 122 and is removably threaded into the internal threads 126 of the at least second sleeve aperture 124 in a locked position.

In FIG. 6, the hat cover body 132 of the removable hat device 100 is shown mounted on the roof 102 of a vehicle, without the top planar member 134 of one embodiment of the hat cover body 132. FIG. 6 illustrates the preferred internal components of the hat cover body 132 of the removable hat device 100. Referring to FIG. 6, the hat base 148 preferably includes a circular ring shaped platform 150. As can be seen, the circular ring shaped platform 150 is disposed inside of the hat cover body 132. The circular ring shaped platform 150 preferably has tabs 174a, 174b that are connected, respectively, to a plurality of inner portions 152a, 152b of the corrugated wall of the hat cover body 132.

As shown in FIG. 6, the central cylindrical support column 154 is attached to the circular ring shaped platform 150 via a plurality of spokes 156a, 156b extending outwardly from the central cylindrical support column 154. The plurality of spokes 156a, 156b are preferably welded to the central cylindrical support column 154. The circular ring shaped platform 150 includes a plurality of connection tabs 174a, 174b, 174c disposed along an outer periphery of the circular ring shaped platform 150.

As shown in FIG. 6, in a preferred embodiment, the connection tab 174a is removably connected to a portion 152a of the corrugated wall 140 of the hat cover body 132. The connection tab 174b is removably connected to a portion 152b of the hat cover body 132.

In another embodiment, the removable hat device 100 further includes a battery 178 and a power cord 180. The battery 178 electrically connects to the light emitting diodes (176, shown in FIG. 1) and the power cord 180 electrically connects the battery 178 to the light emitting diodes (176, shown in FIG. 1). Further, the power cord 180 is adapted to removably connect to a 12-volt outlet of the motor vehicle roof 102.

In yet another embodiment, the removable hat device 100 includes a Bluetooth speaker 182 preferably disposed along the outer surface of the annular wall 136 of the hat cover body 132, as illustrated in FIG. 1. In one such embodiment, the Bluetooth speaker 182 includes an internal battery 184 adapted to be recharged by a user. In another embodiment, the removable hat device 100 includes a Bluetooth speaker 186 disposed within the top planar member 134 of the hat cover body 132, oriented either upwardly or downwardly as illustrated in FIG. 1. In one such embodiment, the Bluetooth speaker 186 includes an internal battery 188 adapted to be recharged by a user. In one embodiment, the removable hat device 100 includes a battery electrically connected to the Bluetooth speaker (e.g., 182, 186). In yet another embodiment, the removable hat device 100 includes a power cord connected to the Bluetooth Speaker (e.g., 182, 186), and that power cord is adapted to removably connect to a 12-volt outlet of the motor vehicle.

Through embodiments of the invention disclosed herein, a user can decorate the user's vehicle 102 while at the same time also play music using the Bluetooth speaker (e.g., 182, 186) outside of the user's vehicle 102, such as, for example, while tailgating at an event or while driving the vehicle 102 in a parade during Mardi Gras. Through such embodiments, the user can utilize the removable hat device 100 as an external speaker, which the user can easily mount and dismount from the top 102 of the user's vehicle. Similarly, the user can easily mount and dismount the removable hat device 100 from the top of the hood or the trunk of the user's vehicle.

In one embodiment, the hat base 148 includes a circular ring shaped platform 150 adapted to connect to a hat cover body 132. The hat base 148 includes a central cylindrical support column 154 attached to the circular ring shaped platform 150 via the plurality of spokes 156a, 156b extruding from the central cylindrical support column 154. The cylindrical support column 154 is telescopically received in the upstanding hollow cylindrical sleeve 120. The central cylindrical support column 154 defines a first locking aperture 158 in coaxial alignment with at least a second locking aperture 160. In one embodiment, the removable hat device 100 includes a Bluetooth speaker 182 preferably disposed along an outer surface of the hat cover body 132, as illustrated in FIG. 1. In one such embodiment, the Bluetooth speaker 182 includes an internal battery 184 adapted to be recharged by a user. In yet another embodiment, the removable hat device 100 includes a power cord connected to the Bluetooth Speaker (e.g., 182, 186), and that power cord is adapted to removably connect to a 12-volt outlet of the motor vehicle.

Referring to FIGS. 1-6, the removable hat device 100 is preferably constructed either of a thermoplastic material, a composite material, a metal, a metal alloy material, or a single piece of unitary construction.

As can be appreciated from the disclosure herein, embodiments of the present invention enable a user to interchangeably utilize multiple types of decorative/attractive hat cover body, while maintaining the same base housing. Thus, embodiments disclosed herein obviate the need to own and store different hat cover body as well as obviate the costs of otherwise purchasing multiple hat devices/cones. Embodiments of the disclosed invention allow the user to save certain costs of buying a new hat device every time for a new occasion, because the user can easily interchange the desired decorative hat cover body by removably connecting them to the base housing.

In some embodiments, product information and promotional information is preferably applied to the top surface 108 of the base housing 104, and on the annular wall 136 of the hat cover body 132, as tailored to the user's desired marketing strategies. Advertising with the removable hat device 100 provides mechanisms to promote specific marketing initiatives, including promoting various services and festive wishes.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

The drawings and the forgoing description give examples of embodiments. Those skilled in the art will appreciate that one or more of the described elements may be very well combined into a single functional element. Alternatively, certain elements may be split into multiple functional elements. Elements from one embodiment may be added to another embodiment. For example, the orders of the processes described herein may be changed and are not limited to the manner described herein. Moreover, the actions of any flow diagram need not be implemented in the order shown; nor do all of the acts necessarily need to be performed.

Also, those acts that are not dependent on other acts may be performed in parallel with the other acts. The scope of embodiments is by no means limited by these specific examples. The components of the system including the devices and related technologies mentioned above are collectively used to improve performance of the insulated cap device.

Numerous variations, whether explicitly given in the specification or not, such as differences in structure, dimension, and use of material, are possible, based upon the disclosure provided herein. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The claimed invention is:

1. A removable hat device for a motor vehicle roof, comprising:
    a base housing comprising a planar base body having a top surface opposite a bottom surface, said base housing comprising a skirt wall extending transversely from the bottom surface and defining an inner housing cavity,
    said base housing comprising a plurality of rubber coated magnetic feet fixed to the bottom surface of said planar base body within said inner housing cavity, said plurality of rubber coated magnetic feet adapted to removably magnetically adhere to the roof of the motor vehicle;
    said base housing comprising an upstanding cylindrical sleeve extending upwardly from the top surface of the planar base body, said upstanding cylindrical sleeve defining at least a first sleeve aperture in coaxial alignment with at least a second sleeve aperture, the at least second sleeve aperture having internal threads;
    a tubular guide fixed to the top surface of said planar base body, said tubular guide defining a passageway in coaxial alignment with said at least first sleeve aperture and said at least second sleeve aperture;
    a hat cover body comprising a top planar member, an annular wall extending from said top planar member and defining a hat cover body inner cavity, and a corrugated wall extending from said top planar member, said annular wall defining at least one annular wall aperture, said corrugated wall concentrically disposed within said hat cover body inner cavity, said corrugated wall having a plurality of outer portions fixed to an inner surface of the annular wall, said corrugated wall defining at least one corrugated wall aperture in coaxial alignment with the at least one annular wall aperture, the at least first sleeve aperture and the at least second sleeve aperture;
    a hat base comprising a circular ring shaped platform disposed within the hat cover body, said circular ring shaped platform connected to a plurality of inner portions of the corrugated wall of the hat cover body;
    a central cylindrical support column attached to the circular ring shaped platform via a plurality of spokes extruding from said central cylindrical support column, said central cylindrical support column telescopically received in the upstanding cylindrical sleeve, said central cylindrical support column defining at least a first locking aperture in coaxial alignment with at least a second locking aperture;
    an elongated bolt removably extended through said tubular guide, through said at least one annular wall aperture, through said at least one corrugated wall aperture, through said at least first sleeve aperture, through said at least first locking aperture, and through said at least second locking aperture, the elongated bolt removably threaded into the internal threads of the at least second sleeve aperture in a locked position.

2. The removable hat device for a motor vehicle roof of claim 1, the hat cover body comprising a rope tassel having a fixed end opposite a free end, the fixed end connected to a top surface of the top planar member of the hat cover body.

3. The removable hat device for a motor vehicle roof of claim 1, wherein each rubber coated magnetic foot of said plurality of rubber coated magnetic feet comprises a shape of a round disk.

4. The removable hat device for a motor vehicle roof of claim 1, further comprising a plug removably inserted into the at least one annular wall aperture, said plug adapted enclose the annular wall when said elongated threaded bolt is in the locked position.

5. The removable hat device for a motor vehicle roof of claim 1, the circular ring shaped platform comprising a plurality of connection tabs disposed along an outer periphery of the circular ring shaped platform, wherein said plurality of connection tabs are removably connected to, respectively, a plurality of portions of said corrugated wall of the hat cover body.

6. The removable hat device for a motor vehicle roof of claim 1, further comprising a plurality of light emitting diodes disposed along an outer surface of the annular wall of said hat cover body.

7. The removable hat device for a motor vehicle roof of claim 6, further comprising a battery electrically connected to said light emitting diodes.

8. The removable hat device for a motor vehicle roof of claim 6, further comprising a power cord electrically connected to said light emitting diodes, said power cord adapted to removably connect to a 12 volt outlet of the vehicle.

9. The removable hat device for a motor vehicle roof of claim 6, further comprising a short-range wireless speaker disposed along the outer surface of the annular wall of the hat cover body.

10. The removable hat device for a motor vehicle roof of claim 6, further comprising a short-range wireless speaker disposed within the top planar member of the hat cover body.

11. The removable hat device for a motor vehicle roof of claim 1, wherein the hat cover body is molded in the shape of a graduation hat.

12. A removable hat device for a motor vehicle roof, comprising:

a base housing comprising a planar base body having a top surface opposite a bottom surface, said base housing comprising a skirt wall extending transversely from the bottom surface and defining an inner housing cavity, said base housing comprising a plurality of rubber coated magnetic feet fixed to the bottom surface of said planar base body within said inner housing cavity, said plurality of rubber coated magnetic feet adapted to removably magnetically adhere to the roof of the motor vehicle at the option of a user;

said base housing comprising an upstanding cylindrical sleeve extending upwardly from the top surface of the planar base body, said upstanding cylindrical sleeve defining at least a first sleeve aperture in coaxial alignment with at least a second sleeve aperture, the at least second sleeve aperture having internal threads;

a tubular guide fixed to the top surface of said planar base body, said tubular guide defining a passageway in coaxial alignment with said at least first sleeve aperture and said at least second sleeve aperture;

a hat base comprising a circular ring shaped platform adapted to connect to a hat cover body, said hat base comprising a central cylindrical support column attached to the circular ring shaped platform via a plurality of spokes extruding from said central cylindrical support column, said central cylindrical support column telescopically received in the upstanding cylindrical sleeve, said central cylindrical support column defining at least a first locking aperture in coaxial alignment with at least a second locking aperture;

an elongated bolt removably extended through said tubular guide, through said at least first sleeve aperture, through said at least first locking aperture, and through said at least second locking aperture, the elongated bolt removably threaded into the internal threads of the at least second sleeve aperture.

13. The removable hat device for a motor vehicle roof of claim 12, further comprising the hat cover body defining a hat cover body inner cavity, said hat cover body comprising a wall member having an inner surface attached to at least a portion of the circular ring shaped platform, said circular ring shaped platform disposed within said hat cover body inner cavity, wherein said hat cover body is molded in the form of a graduation hat, said graduation hat comprising a rope tassel having a fixed end attached to a top surface of the hat cover body, said rope tassel having a free end extending outwardly from the top surface of the hat cover body.

14. The removable hat device for a motor vehicle roof of claim 13, further comprising a plurality of light emitting diodes disposed along an outer surface of the hat cover body.

15. The removable hat device for a motor vehicle roof of claim 13, further comprising a short-range wireless speaker disposed along an outer surface of hat cover body.

16. The removable hat device for a motor vehicle roof of claim 12, further comprising the hat cover body defining a hat cover body inner cavity, said hat cover body comprising a wall member having an inner surface attached to at least a portion of the circular ring shaped platform, said circular ring shaped platform disposed within said hat cover body inner cavity.

* * * * *